United States Patent [19]

Wellington et al.

[11] Patent Number: 4,978,256

[45] Date of Patent: Dec. 18, 1990

[54] DRILL FIXTURE USEFUL FOR DRILLING HOLES IN BEAD LIKE OBJECTS

[75] Inventors: Robert Wellington; Louis Bell, both of Albuquerque, N. Mex.

[73] Assignee: Rio Grande-Albuquerque, Inc., Albuquerque, N. Mex.

[21] Appl. No.: 542,881

[22] Filed: Apr. 23, 1990

[51] Int. Cl.[5] .................. B23B 41/00; B23B 49/02
[52] U.S. Cl. .................. 408/72 R; 144/93 R; 29/160.6; 408/97
[58] Field of Search .......... 408/72 R, 72 B, 103, 408/104, 115 R, 115 B, 241 B, 1 R, 97, 104; 144/93 R; 29/160.6

[56] References Cited

U.S. PATENT DOCUMENTS

| 2,418,956 | 4/1947 | Silver | 408/97 |
| 3,303,727 | 2/1967 | Hackbarth et al. | 408/38 |
| 3,382,741 | 5/1968 | Hackbarth et al. | 408/97 X |

*Primary Examiner*—Steven C. Bishop
*Attorney, Agent, or Firm*—Basile Hanlon

[57] ABSTRACT

A drill fixture for holding and aligning a bead like object, such as a pearl, relative to a drill bit for accurately drilling a bore in the object includes an elongate main body having a base at one end and a clamping member threaded on its opposite end. A pair of like elongate drill guide bushings are respectively mounted in the base and clamp member in opposed coaxial alignment with each other. The opposed ends of the bushings project into an externally accessible recess in the main body and, by actuation of the clamp member, an object to be drilled may be clamped between concave seats on the opposed ends of the bushings in axial alignment with drill guide bores extending through the bushings. The bushings are formed of a relatively firm resilient material to firmly clamp the object without marring the surface of the object. The fixture is formed with an annular flat surfaces on each of its opposite ends to stably support the fixture on a drill press table in either an upright or inverted position while affording drill bit access to the drill guide bore of the uppermost bushing.

8 Claims, 2 Drawing Sheets

DRILL FIXTURE USEFUL FOR DRILLING HOLES IN BEAD LIKE OBJECTS

BACKGROUND OF THE INVENTION

The present invention is directed to a drill fixture useful for drilling holes in or through relatively small bead like objects such as pearls or semi precious stones, for stringing into necklaces, etc., or for mounting upon metal pins. The fixture is especially intended for use in jewelry production or repair.

Drilling of holes into or through pearls presents certain problems not generally encountered when drilling metal objects. Natural pearls are only approximately spherical and are composed of a relatively soft organic substance which is susceptible to marring during the drilling operation. If the pearl is held or clamped too tightly during the drilling operation, its surface will be marred by the excessive pressure applied by the clamp, if the pearl is not held tightly enough, it will spin within the clamp, again resulting in marring of its surface. It is thus quite common in the jewelry industry to manually hold the pearl in position during the drilling operation, particularly when more valuable pearls are being drilled, to avoid the possibility of marring the surface.

However, manually holding the pearl during the drilling operation does not completely eliminate the problem of marring the surface of the pearl, particularly where a bore must extend entirely through the pearl, as in the situation where the pearl is being prepared for stringing into a necklace. The pearl is extremely susceptible to chipping and flaking as the drill tip passes through the pearl surface in completing the through bore. This particular problem can be overcome by drilling the bore part way through the pearl from one side and then inverting the pearl and drilling the remainder of the bore from the opposite side of the pearl. However, this procedure obviously calls for an extremely high degree of precision in locating and aligning the pearl for the second step of the two step drilling operation.

Chipping also tends to occur when the hole through the pearl is redrilled to enlarge the hole, as for the assembly of latch findings at the ends of the pearl strings.

SUMMARY OF THE INVENTION

The present invention takes the form of a drill fixture which may be manually positioned on the table of a drill press which will firmly hold a bead like object, such as a pearl without marring and which enables accurately and precisely aligned bores to be drilled into the bead like object from either side of the object.

In accordance with the present invention, an elongate drill fixture assembly includes a pair of end portions interconnected by a transversely offset central portion to be located in longitudinally aligned and longitudinally spaced relationship to each other. Coaxially aligned bores through the end section extend along a common axis which passes clear of the adjacent side of the central portion. One end section constitutes a base and is of one piece construction, the other end section includes an externally threaded projection coaxial with the bore axis upon which a cap like clamping member is threadably received.

A pair of like drill bushings of a relatively firm resilient material are mounted in the bores in the respective end sections to project into the space between the two end sections at one side of the central portion. The opposed ends of bushings are formed with concave bead receiving seats, and drill guide bores in the respective bushings extend longitudinally through the bushings from the bead seats to open at the opposite end of the bushing. An annular circumferential groove in the outer surface of the bushing enables one of the bushings to be mounted in the base portion of the fixture with a snap fit, while the corresponding groove in the other of the two bushings is received with a snap fit in a bore in the cap like clamping member.

The clamping member may be unthreaded to space the opposed bead seats of the bushings from each other to accommodate the insertion of a pearl or bead to be drilled between the two bead seats. The clamping member is then threadably advanced upon its end portion to drive the bushing coupled to the clamp toward the opposed bushing to clamp the bead or pearl in position between the opposed bead seats of the two bushings. Flat surfaces at the opposite longitudinal ends of the fixture upon the base portion and clamping member are provided to stably support the fixture upon either end upon a flat surface, such as a drill press table. The drill guide bushings may be provided with a shoulder in the drill guide bore engageable by a shoulder on the drill bit to limit the depth of bore being drilled in the bead or pearl held by the fixture. The bead may be partially drilled through from one side, and the fixture then inverted to enable the bead to be drilled from its opposite side.

Other objects and features of the invention will become apparent by reference to the following specification and to the drawings.

Figure 1:
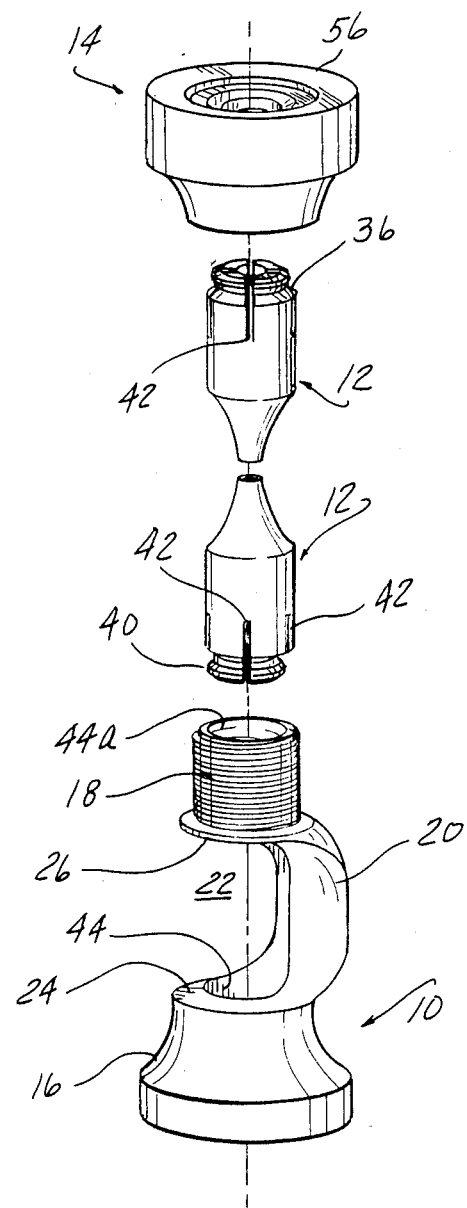
FIG. 1 is an exploded perspective view of the individual elements constituting the fixture of the present invention.
Figures 2, 3:
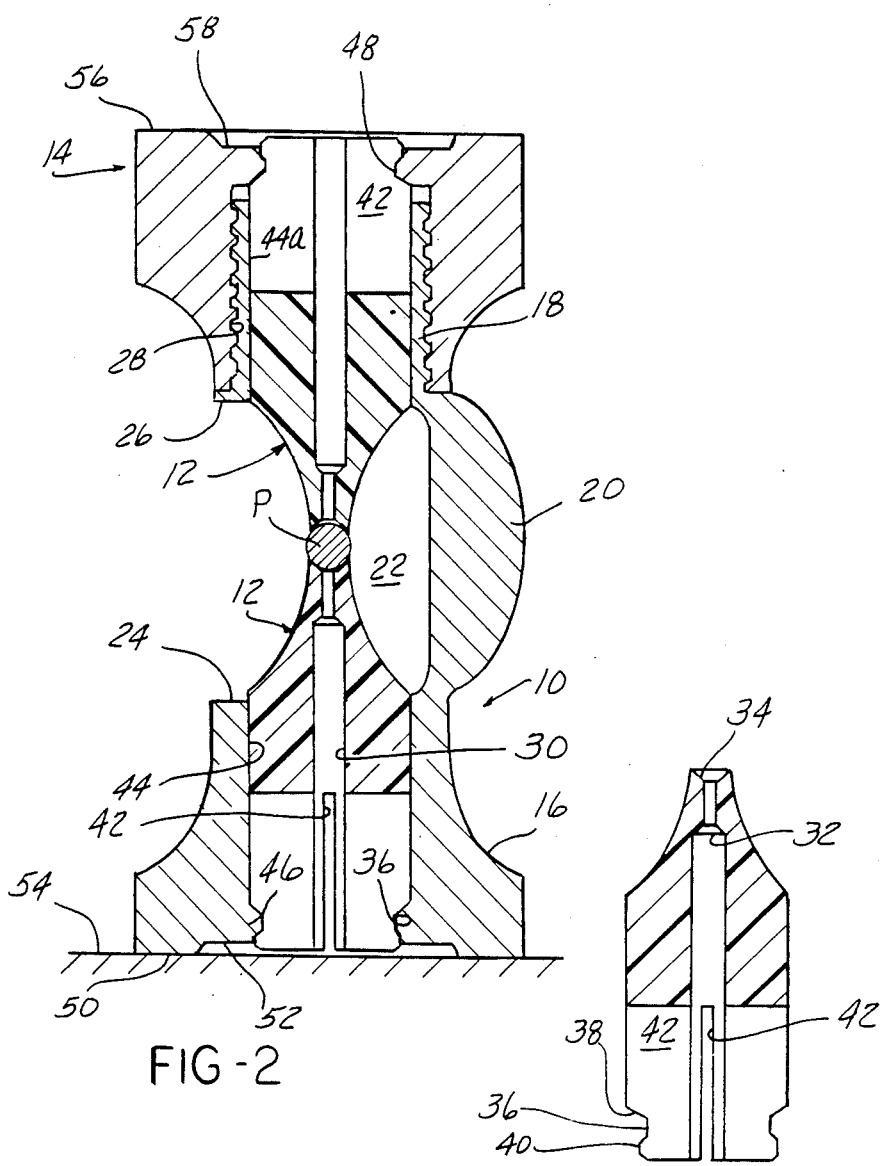
FIG. 2 is a detailed cross sectional view of the assembled fixture taken on a plane containing the longitudinal axis of the fixture.
FIG. 3 is a detailed cross sectional view of a drill guide bushing utilized in the fixture of FIGS. 1 and 2.

The component parts of a drill fixture according to the present invention include, as best seen in FIGS. 1 and 2, a main body designated generally 10, a pair of like drill guide bushings, each designated generally 12 in that they are of identical construction, and a cap like clamping member designated generally 14.

Main body 10 is of one piece construction, and is formed at its lower end, as viewed in FIG. 1, with a base portion 16. At the opposite or upper end of main body 10, an externally threaded projection 18 is interconnected to base 16 by a transversely offset central section 20. The offset central section 20 provides a recess 22 or longitudinal spacing between the upper end 24 of base portion 16 and the lower end 26 of projection 18. As best seen in FIG. 2, clamping member 14 is formed with a central bore whose lower portion is internally threaded as at 28 to enable clamping member 14 to be threadably received upon projection 18 of the main body 10 of the fixture.

Drill guide bushings 12 are formed of a relatively firm material which possesses at least some resilience, such as nylon, for example. Nylon type 101 of a Durometer rating of D80-85 and a compression strength of about 5000 psi is one preferred material. Bushing 12 is of an elongate configuration symmetrical about its longitudinal axis and is formed with a central drill guide bore 30 which, as best seen in FIG. 3, may be formed with an internal shoulder 32 and a concave frusto conical bead receiving seat 34 at one end of the bushing. At the opposite end of the bushing, a circumferential annular groove 36 extending around the outer circumference of the bushing is defined between a locating shoulder 38 and a somewhat smaller retaining shoulder 40. Axially extending slots 42 are formed in bushing 12 to extend inwardly from that end of the bushing adjacent which groove 36 is located to enable this end of the bushing to be radially compressed.

Referring now to FIG. 2, it is seen that a bore 44, 44A extends longitudinally through main body 10 of the fixture, the section 44 of the bore extending upwardly from the bottom of base 16 to open into recess 22 while the bore section 44A extends upwardly from the lower end 26 of projection 18 coaxially through projection 18. At the lower end of the bore section 44, a radially inwardly projecting land 46 is formed to project into the groove 36 of one of the bushings 12. The upper surface of land 46 is complementary to the locating shoulder 38 of bushing 12 to constitute a positive end limit of movement of the bushing 12 downwardly into bore 44. The bushing 12 is inserted into bore 44 from its upper end as viewed in FIG. 2 and the bushing is manually pushed downwardly until the retaining shoulder 40 on the bushing passes downwardly beyond land 46, the resiliency of the bushing material and the slots 42 accommodating the necessary radial compression of the lower end of the bushing to pass land 46. When retaining shoulder 40 is below land 46, shoulder 40 snaps radially outwardly into underlying engagement with land 46, thereby effecting a snap fit of the bushing within the base 16 of the fixture. A similar land 48 is formed at the upper (as viewed in FIG. 2) end of the bore 28 through clamping member 14 to similarly receive the other bushing 12.

As best seen in FIG. 2, the bottom 50 of base 16 is flat and lies in a general plane normal to the axis of the drill guide bores in the respective bushings 12. The surface 50 is recessed as by a counterbore 52 to provide clearance between the lower end of the bushing 12 mounted in base 16 and a horizontal support surface 54 such as the table of a drill press. A similar flat support surface 56 is formed on the upper end of clamp member 14 as viewed in FIG. 2 and a similar counterbore 58 for a similar purpose is provided on clamp member 14.

By unthreading clamping member 14 relative to projection 18, the opposed bead seats 34 at the facing ends of the two bushings 12 may be spaced from each other a sufficient distance to manually locate a bead like object or pearl P to be drilled upon the bead seat 34 of the bushing 12 mounted in base 16. The clamp member 14 is than threaded downwardly onto projection 18 to move the lower end of the upper bushing 12 downwardly into clamping engagement with the bead or pearl P. The nylon material of bushings 12 provides a relatively firm, yet resilient surface which is softer than the pearl, and thus a fairly firm clamping force may be exerted without any substantial risk of marring the surface of the pearl. Bushings having bead seats 34 of differing configurations and sizes may be employed to match the dimensions and configurations of the bead like objects to be drilled.

With the bead or pearl firmly clamped between the bead seats 34 of the opposed bushings, the fixture is manually moved into operative alignment with the drill bit of a drill press or flex shaft machine and the drill is advanced downwardly through the drill guide bore in the upper bushing 12 and fed into the bead like object or pearl clamped between the bushings. The drill bits employed are typically provided with a shoulder which, when engaged with the shoulder 32 in the drill guide bore 30 will establish and end limit of feed of the drill bit into the work. Alternatively, a stop collar may be mounted upon the drill bit to engage the upper end of the fixture to limit the depth of feed. Normally, this limit will be such that the drill is fed to project only slightly more than halfway through the workpiece.

The drill is then withdrawn, and the fixture is inverted so that the support surface 56 on clamp member 14 is now seated upon the work table of the drill press. The drilling procedure described above is than repeated to complete the boring of the hole entirely through the pearl. Because the drill bit never has to pass outwardly through the surface, chipping or flaking of the surface of the pearl or bead like object as the drill bit moves outwardly through the surface will not occur.

While one embodiment of the invention has been described in detail, it will be apparent to those skilled in the art the disclosed embodiment may be modified. Therefore, the foregoing description is to be considered exemplary rather than limiting, and the true scope of the invention is that defined in the following claims.

We claim:

1. A drill fixture useful for drilling holes in bead like objects such as pearls, said fixture comprising a pair of like elongate drill guide bushings of a relatively firm resilient material, each bushing having a concave bead receiving seat at one end thereof and a central drill guide bore extending longitudinally through the bushing from said bead seat to the other end of the bushing, mounting means for mounting said bushings with their drill guide bores in coaxial alignment with each other and the bead seats of the bushings in facing opposed relationship to each other and exposed within an access recess in said mounting means intermediate the opposite ends of said mounting means, said mounting means having drill access openings in its opposite ends accommodating the insertion of a drill into a drill guide bore from either end of said mounting means, clamp means on said mounting means for moving one of said bushings longitudinally of said mounting means relative to the other of said bushings to clamp a bead like object between the bead seats of said bushings, and support means at each end of said mounting means for stably supporting said mounting means at either end upon a horizontal support surface.

2. The invention defined in claim 1 wherein said mounting means comprises an elongate main body including a base section at one end and a longitudinal projection at its other end located in longitudinally spaced longitudinally aligned relationship to said base by a transversely offset central section, said base section and said projection having coaxially aligned bores therethrough, one of said bushings being mounted in the bore in said base section and the other of said bushings being slidably received in the bore in said projection, said clamp means including a clamp member threadably mounted on said projection for threadable adjustment coaxially of said bores, and means detachably coupling the other of said bushings to said clamp member.

3. The invention defined in claim 2 further comprising cooperating snap fit means on said base section and the bushing mounted therein for detachably coupling the bushing within the bore in said base section while establishing a positive end limit of movement of the bushing axially into the bore from the end of the bore facing said projection.

4. The invention defined in claim 3 wherein said snap fit means comprises an annular land projecting radially into the bore in said base section, and means defining an annular groove extending circumferentially of the bushing conformed to receive said land with a snap fit.

5. A drill guide fixture useful for drilling bores in bead like objects such as pearls comprising a pair of like elongate drill guide bushings of a relatively firm resilient material having a longitudinal axis, each of said bushings having a central drill guide bore extending coaxially of said axis through the bushing from end to end, elongate mounting means having a transverse central recess therein between its opposite ends mounting said bushings in longitudinally aligned opposed end to end relationship to each other with opposed ends of said bushings projecting longitudinally of said mounting means into said recess from opposite sides of said recess, the opposed ends of said bushings having concave bead receiving seats therein adapted to locate a bead like object in axial alignment with the drill guide bore axes in said bushings, manually operable clamp means on said mounting means for shifting said bushings axially toward and away from each other to selectively clamp a bead like object between the bead seats of said bushings, and support means for stably supporting said mounting means upon either of its opposite ends on a support surface.

6. The invention defined in claim 5 wherein said mounting means comprises first and second longitudinally aligned end sections interconnected to each other by a transversely offset central section fixedly supporting said end sections in longitudinally spaced relationship to each other to define said central recess, one of said bushings being received within a first bushing bore in said first end section and the other of said bushings being received in a second bushing bore in said second end section coaxially aligned with said first bushing bore, said clamp means comprising a screw thread on said second end section coaxial with said second bushing bore and a clamp member threadably received upon said screw thread and coupled to said other of said bushings to shift said other of said bushings axially of said second bore in response to rotative movement of said clamp member on said screw thread.

7. The invention defined in claim 6 wherein said one of said bushings is detachably mounted in said first end section in a fixed position axially of said first bore.

8. The invention defined in claim 7 wherein said clamp member has a third bushing receiving bore therethrough coaxial with said second bore, said first and third bores each having an annular land projecting radially into the bore defining a stop shoulder facing said central recess, each of said bushings having a circumferential groove adjacent the end of the bushing remote from said bead receiving seat adapted to receive said land with a snap fit.

* * * * *